Nov. 29, 1966 JEAN-CLAUDE M. R. DUVAL 3,289,050

SIGNAL SHAPE RESTITUTING RECEIVER FOR CARRIER-CURRENT CODED SIGNALS

Filed Dec. 23, 1963

3,289,050
Patented Nov. 29, 1966

3,289,050

SIGNAL SHAPE RESTITUTING RECEIVER FOR CARRIER-CURRENT CODED SIGNALS

Jean-Claude Maurice Raoul Duval, Conflans-Sainte-Honorine, France, assignor to Lignes Telegraphiques & Telephoniques, Paris, France Filed Dec. 23, 1963, Ser. No. 332,618
Claims priority, application France, Apr. 11, 1963, 931,215
9 Claims. (Cl. 317—148.5)

Figure 1:
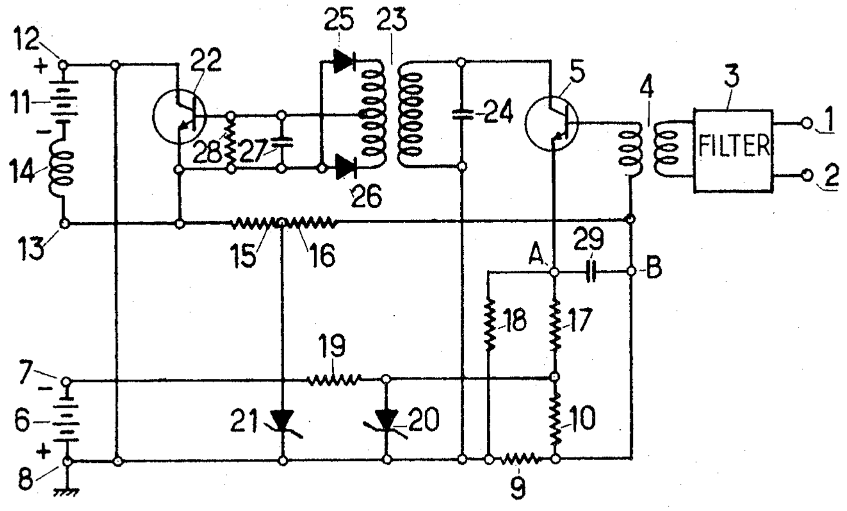

The present invention relates to receivers for carrier-current amplitude-modulated signals, the original envelope wave shape of which is a rectangular one, while the envelope of the actually received signals is more or less distorted in the transmission path from the transmitting to the receiving end of said path, such distortion arising from propagation medium conditions, frequency filtering at the input to the receiver for protection against disturbances in the transmission path, or from any other cause.

Rectangular wave shape signals are commonly used as telegraph signals or for transmission of binary coded data, or also as selection, ringing and supervision signals in long-distance automatic switching telephone networks. They are usually produced by "on-off" modulation of a sinusoidal carrier-current, whose frequency may be a voice frequency or a much higher one, for instance that of a channel carrier-current in a frequency division multiplex telephone system.

At the receiving end of a communication system in which such "coded" signals are transmitted, the distortion they undergo from the various above-mentioned causes appears as a time lag at the beginning and at the end of each elementary signal. This distortion persists in the restituted direct-current signals obtained through detection of the amplitude-modulated carrier wave, which results in a change in the duration of the signals finally transmitted to a utilization circuit, for instance an electromagnetic relay, the operation of which is controlled by said detected direct-current signals or, else, a further retransmission circuit.

From another viewpoint, the level of the signals at the input to the receiver is likely to present rather large variations, which may reach for instance several tens of decibels. It is also obvious that, for a signal of a given wave shape, the instantaneous amplitude at every point of the distorted leading and rear edges of said signal is proportional to the maximum amplitude of the same signal. Consequently, the instants when the instantaneous amplitude of the direct-current signals passes through critical values, at the beginning and at the end of the operation of an apparatus controlled by said direct-current signals, depend on the said maximum amplitude, wherefrom it results that the duration of a signal retransmitted by such apparatus differs from its original duration at the sending end of the system, the difference between said durations depending on the value of said maximum amplitude.

The invention has for its object a device capable of elaborating received signals, the envelope of which was of rectangular shape before their being distorted in the transmission path, in such a manner that direct-current signals reconstituted from said distorted received signals have a duration as close as possible to that of said signals at the point of the system they are sent from, and so to enable the apparatus controlled by said received signals to operate properly.

Devices have already been proposed, for instance in the U.S. patent Serial No. 3,075,129 to R. Dallemagne, which are to a certain extent capable of fulfilling such conditions. Some of the arrangements described in the latter patent, for instance the use of two transistors and a feedback circuit, have been retained in the present invention. However, the device according to the present invention does not include the third transistor in a blocking circuit arrangement found in the latter patent, and the means employed for the restitution of correct signal duration and shape are different and somewhat simpler.

According to the present invention, there is provided a receiving and shaping device for coded carrier-current signals, comprising input terminals for receiving signals, a bandpass filter for filtering said signals, an input transformer having a primary winding fed from the output of said filter and a secondary winding having a first and a second terminal, said first terminal being connected to the base electrode of a first transistor so biassed as to have only a very low gain in its rest condition, means for transmitting signals amplified by said first transistor to a rectifying circuit, means for applying the rectified voltage from said rectifying circuit to the base electrode of a second transistor so biassed as to have in its rest condition a substantially zero collector current, a load impedance in the collector circuit of said second transistor, first and second direct-current supply source for said first and second transistors, a biassing circuit for biassing all electrodes of said transistors from said source, a first point at a constant reference potential in said biassing circuit, a resistor connecting the emitter of said first transistor to a second point in said biassing circuit, a connection connecting said second terminal of said secondary winding of said transformer to a third point in said biassing circuit, a condenser having one of its terminals connected to said emitter of said first transistor and its other terminal connected to said second terminal of said secondary winding, and a feedback connection means including direct-current voltage threshold means and connecting one terminal of said load impedance to said second terminal of said secondary winding wherethrough part of the direct-current voltage across said load impedance is applied to said base electrode of said first transistor, whereby the gain of said first transistor is suddenly increased by the operation of said feedback circuit when signals are suddenly applied to said input terminals and suddenly decreased by the direct-current charge stored in said condenser when signals cease to be applied to same said input terminals; said receiving device further comprising means for causing the collector current of said second transistor to operate a working circuit.

In the practical applications of the system of the invention, said working circuit, together with said load impedance, generally consist of a winding of an electromechanical relay.

In the hereafter given description, the second transistor, hereinabove referred to, will be designated as "the relay transistor," as it should have characteristics as close as possible to those of a relay contact, i.e., an impedance as high as possible in the rest condition and as low as possible in the working condition, and as it should also be able to pass as quickly as possible from its non-conducting to its conducting condition (or conversely), without remaining for any appreciable time in an intermediate condition.

The invention will now be described in greater detail with reference to the annexed drawings, in which FIGS. 1 and 2 each show a particular embodiment of the invention, this by way of example and without limiting the scope of the invention.

Referring to FIG. 1, signals arriving at terminals 1 and 2 are applied through a bandpass filter 3 (having a passband narrow enough for eliminating undesirable currents of extraneous frequencies which could disturb the operation of the system) to the primary winding of a transformer 4, the secondary winding of which has one of its terminals connected with the base electrode of transistor 5, shown as an n-p-n transistor in the drawing.

A permanent direct-current bias voltage is applied to the base electrode of transistor 5. This bias voltage is obtained, on one hand, from a direct-current voltage supply source 6 (for instance, a 48-volt storage battery), connected between terminal 7 and terminal 8 connected to a constant potential point hereinafter referred to as "ground"; this part of the bias voltage is obtained through a voltage divider consisting of resistors 9 and 10. On the other hand, a further part of the bias voltage is derived from a second direct-current voltage source 11 (for instance, another 48-volt storage battery of the kind generally found in telephone exchanges) connected between a terminal 12, itself directly connected to the ground terminal 8, and a terminal 13 through an impedance which may be, for instance, that of a winding 14 of an electromechanical relay associated with a utilization circuit, said second part of said bias voltage being obtained from a further voltage divider consisting of resistors 9, 15 and 16.

The emitter electrode of transistor 5 is biassed from the direct-current source 6 through the voltage divider consisting of resistors 17 and 18.

To eliminate the possibility of the bias of transistor 5 being modified by small variations of the voltage of battery 6, the supply voltage from 6 is stabilized by a resistor 19 and a regulator diode (Zener diode) 20.

Figure 2:
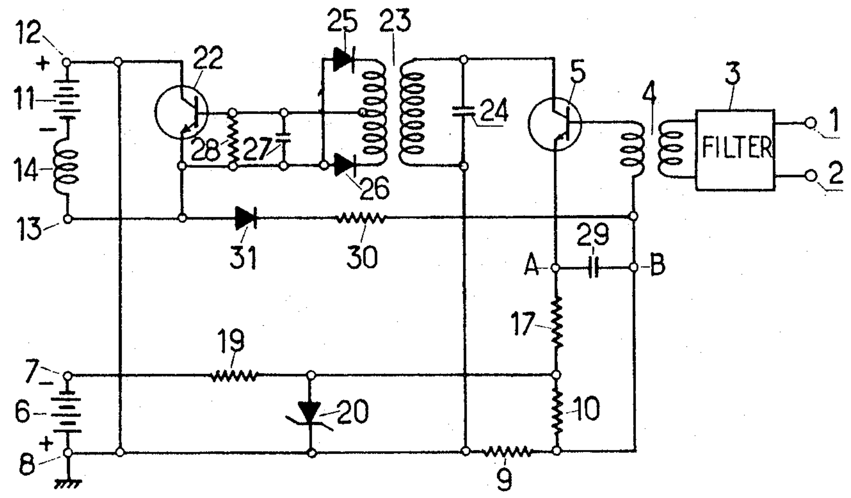

In a similar manner, to eliminate the influence of small variations of the voltage of battery 11 on the bias of transistor 5, various arrangements may be adopted, among which those shown on FIGS. 1 and 2 have been retained. In the arrangement of FIG. 1, a resistor 15 and a regulator diode 21 stabilize the voltages; no direct-current feedback effect through resistor 16 occurs, except if the potential of point 13 becomes lower than the operating voltage of the regulator diode 21.

Transistor 5 is so biassed that its rest collector current be very weak, for instance of the order of one hundred microamperes, this resulting in a very low gain for the amplifier stage including this transistor.

The collector current of transistor 5 operates the control circuit of the relay transistor 22 through a transformer 23, the primary winding of which is tuned to the carrier frequency by a condenser 24, and the secondary winding of which feeds a rectifying device consisting of a pair of rectifiers 25 and 26 and of a filtering condenser 27.

The rectified current at the output of the rectifying device is applied to transistor 22, between its base and emitter electrodes. The latter electrode is directly connected to terminal 13, while the base electrode is connected to 13 through a resistor 28. A feedback circuit consisting of resistors 15 and 16 connects terminal 13 to the base electrode of transistor 5.

In the rest condition, when no signals are received, the relay transistor is blocked, as its base electrode is connected with its emitter electrode through resistor 28, and as no voltage difference is applied to the base-emitter junction of this transistor.

Upon the arrival of an elementary signal, transistor 5 begins to amplify. Consequently, and through transformer 23 and rectifiers 25, 26, a direct-current voltage appears across condenser 27 and is applied between the base and emitter electrodes of transistor 22. The potential of the base electrode of 22 then becomes a positive one and transistor 22 begins to let current through. The weak current so induced in the collector circuit causes a voltage drop to appear across impedance 14 in the utilization circuit, which decreases the potential difference between terminals 12 and 13. Through the intermediate voltage divider formed by resistors 9, 10, 15 and 16, the decrease in the potential difference between 12 and 13 makes the base electrode of transistor 5 more positive with respect to its emitter electrode, and thereby increases the gain of transistor 5. A positive feedback effect is thus obtained, which results in an increase of the direct-current voltage across condenser 27 and quickly drives the collector current of transistor 22 into its saturation condition.

At the end of an elementary signal, the same phenomena occur in the reverse order.

In either case, the sudden variation in the gain of the amplifier stage comprising transistor 5 causes transistor 22 to suddenly pass from its non-conducting to its conducting condition, or conversely, thus avoiding the existence during any noticeable time interval of an intermediate condition which would correspond to intermediate voltage values between the collector and emitter of transistor 22 and to intermediate current values in the collector-emitter circuit of same. Such intermediate values would result in a condition where power dissipation in transistor 22 would be high and would possibly cause damage and even total failure.

Transistor 22 may be, for instance, an n-p-n silicon transistor with a high collector-emitter breakdown voltage, allowing overvoltages of the order of 120 volts to appear when the collector current is suddenly cut off on an inductive load such as a winding of an electromagnetic relay.

The just described phenomena have for their main consequence that of causing the relay transistor to suddenly pass from its conducting to its non-conducting state, or conversely, this without any intermediate state of noticeable duration. This also results in some shortening of the transition times corresponding to the beginning and the end of an elementary signal. However, this does not happen to a sufficient extent for giving back the received signal its original shape and duration.

To obtain such a faithful restitution of the original shape and duration of the signal, the arrangement of the present invention makes use of a condenser 29 connected between terminal A, itself connected to the emitter electrode of transistor 5, and terminal B connected through the secondary winding of the input transformer 4 to the base electrode of the same transistor. Condenser 29 cooperates with resistors 10 and 17 to create the desired effect, as will now be shown.

Both the charging and discharging times of condenser 29 are so predetermined as to be comprised between the leading or rear edge durations of the signals and the total duration of these signals. By way of example, charging and discharging times of 4 to 5 milliseconds should be provided for signals having a minimum duration of 20 milliseconds.

The so-determined dimensioning of condenser 29 allows to obtain, on one hand a low impedance at the carrier-current frequency, and on another hand a regulating effect for the amplification of the latter signals, thanks to the lower rate of variation of the biassing voltage of transistor 5.

At the beginning of a signal, transistor 5 is biassed at a given potential difference between its base and emitter. When the amplitude of the applied carrier-current signal reaches a certain value for which a collector current begins to flow through transistor 22, the potential of point 13, and consequently that of point B become closer to the positive potential of points 8 and 12.

The gain of transistor 5 then tends to increase, since the potential of point B and consequently that of the base of transistor 5 (which is of the n-p-n type) tend to more positive values with respect to point A. The apparatus then rapidly passes to its operating condition as soon as the instantaneous amplitude of the received signal reaches the required threshold value. The increase in the direct-current potential applied to point B results, by negative feedback action through resistor 17, in a similar increase in the potential of point A.

Given an initially selected bias point, transistor 5 is operated near the cut-off point, in a part of its characteristic curve having a strong curvature. Consequently, when a sinusoidal signal is applied, the amplification of this signal is greater for the positive half-waves than for the negative ones. This results in an increase in the average current intensity through resistor 17. The potential difference between the terminals of resistor 17 increases and the potential of point A becomes closer to that of point 8.

The potential difference $(V_B-V_A)$ betweent B and A thus tends to decrease, but cannot reach its final value before a certain time interval has elapsed, said time interval depending on the capacity of condenser 29. This final value will be all the lower that the amplitude of the signal applied to the input terminals of the apparatus is the higher.

When the peak voltage V appearing between the terminals of the secondary winding of transformer 4 increases, the positive direct-current voltage $(V_B-V_A)$ applied between the emitter and base electrodes of transistor 5 decreases; the combined voltage $v$ resulting from the addition of V and $(V_B-V_A)$ is applied between the emitter and base electrodes of transistor 5 and tends to keep a constant value for the positive values of V, as the effect of the latter voltage is the predominating one; this results in a regulating effect in the operation of the device.

The latter effect is especially advantageous near the end of an elementary signal. When voltage V begins to decrease, $v$ also begins to decrease, and transistor 5 rapidly reaches an operating point near its cut-off. The amplification of the signal thus rapidly vanishes, which tends to improve the wave shape of the restituted signal in its final part.

FIG. 2 shows another example of embodiment of the invention. It does not much differ from that of FIG. 1, except for the arrangement of the biassing and feedback circuits, the general principle of operation of both devices being substantially the same.

The elements of FIG. 2 which are identical with those of FIG. 1 and play the same parts have been designated by the same reference numerals.

In the device of FIG. 2, the permanent bias applied to the base electrode of transistor 5 is derived from source 6 by means of the voltage divider consisting of resistors 9 and 10. The emitter electrode of 5 is biassed by the rest current of 5 flowing through resistor 17.

A direct-current feedback circuit including resistor 30 and diode 31 connects terminal 13 to the base electrode of transistor 5 through the secondary winding of the input transformer 4.

The direct-current source 11 does not influence the bias of transistor 5 in its rest condition, since diode 31 is then in the reverse bias condition and thus presents a very high impedance preventing direct-current flow between terminal 13 and point B. The direct-current feedback effect through resistor 30 does not appear before the instant when the potential of terminal 13 becomes higher than that of point B, a condition which results from the arrival of signals at the input of the device. Diode 31 then begins to work in the conduction region of its characteristic curve.

The feedback circuit consisting of resistor 30 and diode 31 plays the same part as the feedback circuit of FIG. 1 does, i.e. it causes the relay transistor 22 to pass from its non-conducting to its conducting state (or reciprocally), without remaining for an appreciable time in an intermediate condition. The circuit consisting of condenser 29 and resistors 10 and 17 operates as previously explained in the case of FIG. 1.

It is, of course, possible to use in the described devices other transistor types than those mentioned in the hereinabove given description; for instance, p-n-p transistors might as well be employed, subject to the usual corresponding changes in the circuit.

What is claimed is:

1. A receiving and shaping device for coded carrier-current signals, comprising input terminals for receiving signals, a bandpass filter for filtering said signals, an input transformer having a primary winding fed from the output of said filter and a secondary winding having a first and a second terminal, said first terminal being connected to the base electrode of a first transistor having base, collector and emitter electrodes and so biassed as to have only a very low gain in its rest condition, means for transmitting signals amplified by said first transistor to a rectifying circuit, means for applying the rectified voltage from said rectifying circuit to the base electrode of a second transistor having base, collector and emitter electrodes and so biassed as to have in its rest condition a substantially zero collector current, a two-terminal load impedance inserted in the collector circuit of said second transistor, a first and a second direct-current supply source for said first and second transitors, a biassing circuit for biassing all electrodes of said transistors from said sources, a first point at a constant reference potential and common to said sources in said biassing circuit, a connection connecting the emitter of said first transistor to a second point in said biassing circuit, a connection connecting a second terminal of said secondary winding of said transformer to a third point in said biassing circuit, a condenser having one of its terminals connected to said emitter of said first transistor and its other terminal connected to said second terminal of said secondary winding, and a feedback circuit including direct-current voltage threshold means and connecting one terminal of said load impedance to said second terminal of said secondary winding, wherethrough part of the direct-current voltage across said load impedance is applied to said base electrode of said first transistor, whereby the gain of said first transistor is suddenly increased by the operation of said feedback circuit when signals are suddenly applied to said input terminals and suddenly decreased by the direct-current charge stored in said condenser when signals cease to be applied to same said input terminals; said receiving device further comprising means for causing the collector current of said second transistor to operate a working circuit.

2. A device as claimed in claim 1, wherein said load impedance consists of the impedance of a winding of an electromechanical relay, and wherein said relay operates said working circuit.

3. A device as claimed in claim 1, wherein said feedback connection means consist of a first and a second resistor in series-connection with their common point connected to said first point at a constant potential through a Zener diode.

4. A device as claimed in claim 1, wherein said feedback connection means consist of a single resistor in series connection with a semiconductor diode to which a reverse biassing voltage is applied through said biassing circuit.

5. A device as claimed in claim 1, wherein said biassing circuit includes a resistance network forming at least one voltage divider wherein said biassing circuit includes a fouth point having a constant voltage difference with respect to said first point, and wherein a Zener diode is connected between said first and fouth points, said further Zener diode being fed from said first direct-current supply source through a series resistor.

6. A device as claimed in claim 5, including first and second voltage dividers respectively biassing said emitter and base electrodes of said first transistor, and wherein both said first and second voltage dividers are fed from said voltage difference between said first and fourth points.

7. A device as claimed in claim 6, wherein said first voltage divider consists of a first and a second resistor in series connection the series assembly of which is connected between said first and fourth points in said biassing circuit, and wherein said second point is the common point to both latter said resistors and is directly connected to the emitter of said first transistor.

8. A device as claimed in claim 7, wherein said second voltage divider consists of two series-connected resistors having their non-common terminals respectively connected to said first point and to said fourth point in said biassing circuit, and wherein the common point to latter said series-connected resistors is directly connected to said second terminal of said secondary winding.

9. A device as claimed in claim 1, wherein said biassing circuit includes a fourth point having a constant voltage difference with respect to said first point, wherein a Zener diode is connected between said first and fourth points, said further Zener diode being fed from said first direct-current supply source through a series resistor, and wherein said emitter of said first transistor is connected to said fourth point through a biassing resistor.

References Cited by the Examiner

UNITED STATES PATENTS 3,075,129 1/1963 Dallemagne -------- 317—148.5

ARTHUR GAUSS, *Primary Examiner.*

S. D. MILLER, *Assistant Examiner.*